United States Patent Office 3,452,062
Patented June 24, 1969

3,452,062
(OPTIONALLY 17-ALKYLATED) 11β-ACYLOXY-
ESTR - 4 - ENE - 3β,17β - DIOLS AND ESTERS
THEREOF
John S. Baran, Morton Grove, Ill., assignor to G. D.
Searle & Co., Chicago, Ill., a corporation of Delaware
No Drawing. Filed Feb. 16, 1967, Ser. No. 616,470
Int. Cl. C07c *169/00, 171/00*
U.S. Cl. 260—397.5                              9 Claims

ABSTRACT OF THE DISCLOSURE (Optionally 17-alkylated) 11β-acyloxyestr - 4-ene-3β, 17β-diols and esters thereof useful in view of their pharmacological activity, e.g. anabolic, androgenic, and anti-inflammatory, and preparable by acylation of the corresponding 11β-hydroxy-3-keto-Δ$^4$ starting materials followed by reduction of the 3-keto group, and optionally, subsequent acylation of the remaining free hydroxy groups.

---

The present invention relates to novel 11-acyloxy steroidal derivatives and, more particularly, to the (optionally 17 - alkylated) 11β - acyloxyestr - 4 - ene-3β,17β-diols and corresponding esters represented by the following structural formula

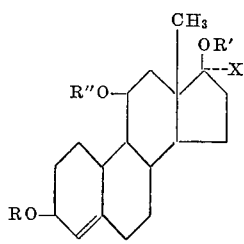

In that structural representation, R and R' can be hydrogen or a lower alkanoyl radical while R" is invariably a lower alkanoyl radical and X is hydrogen or a lower alkyl radical.

Examples of the lower alkyl radicals denoted by X are methyl, ethyl, propyl, butyl, pentyl, hexyl, heptyl and the branched-chain groups isomeric therewith.

Illustrative of the lower alkanoyl radicals encompassed in the R, R' and R" terms are formyl, acetyl, propionyl, butyryl, valeryl, caproyl, heptanoyl and the branched-chain isomers thereof.

Starting materials conveniently utilized in the manufacture of the instant compounds are the 17-oxygenated 11β-hydroxyestr-4-en-3-ones represented by the following formula

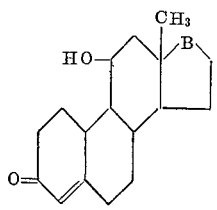

wherein B is a carbonyl, β-hydroxymethylene, β-(lower alkanoyl)oxy methylene or α-(lower alkyl)-β-hydroxy methylene radical. Acylation of those materials with a lower alkanoic acid anhydride or halide, preferably in the presence of a suitable acid acceptor such as pyridine or triethylamine, affords the corresponding intermediate 11-(lower alkanoates). 11β,17β - dihydroxy - 17α-methylestr-4-en-3-one, for example is contacted with acetic anhydride and pyridine to yield 11β-acetoxy-17β-hydroxy-17α-methylestr-4-en-3-one. Reduction of those 11-acyloxy intermediates, typically with a metallic reagent such as lithium tri-(tertiary-butoxy) aluminum hydride affords the corresponding 3-hydroxy compounds. A specific illustration is the reaction of 11β-acetoxy-17β-hydroxy-17α-methylestr-4-en-3-one with lithium tri-(tertiary-butoxy) aluminum hydride in tetrahydrofuran to afford 17α-methylestr-4-ene-3β,11β,17β-triol 11-acetate.

The instant 3-acyloxy compounds are conveniently produced by acylation of the corresponding 3-hydroxy substances according to the process described hereinbefore. The aforementioned 17α-methylestr-4-ene-3β,11β, 17β-triol 11-acetate, for example, is warmed briefly with acetic anhydride and pyridine to yield 17α-methylestr-4-ene-3β,11β,17β-triol 3,11-diacetate.

The compounds of this invention exhibit valuable pharmacological properties. They are hormonal agents, for example, as is evidenced by their potent anti-inflammatory, anabolic and androgenic properties.

The invention will appear more fully from the examples which follow. These examples are given by way of illustration only and are not to be construed as limiting the invention either in spirit or in scope as many modifications both in materials and in methods will be apparent from this disclosure to those skilled in the art. In these examples, temperatures are given in degrees centigrade (° C.) and quantities of materials in parts by weight unless otherwise noted.

Example 1

A mixture containing 5.1 parts of 11β, 17β-dihydroxy-17α-methylestr-4-en-3-one, 10 parts of acetic anhydride and 17 parts of pyridine is stirred at room temperature for about 24 hours, then is poured carefully, with stirring, into a mixture containing 50 parts of ice and 150 parts of water. The resulting aqueous mixture is extracted with benzene, and the benzene solution is separated, washed with water, dried over anhydrous magnesium sulfate and concentrated to dryness under reduced pressure to afford 11β-acetoxy-17β-hydroxy-17α-methylestr-4-en-3-one.

To a solution of 5.5 parts of 11β-acetoxy-17β-hydroxy-17α-methylestr-4-en-3-one in 90 parts of tetrahydrofuran is added 10 parts of lithium tri-(tertiary-butoxy) aluminum hydride, and the resulting solution is stirred at room temperature for about 30 minutes, then is poured carefully into approximately 200 parts by volume of saturated aqueous sodium potassium tartrate. That mixture is stirred with approximately 440 parts of benzene for about 10 minutes, and the organic layer is separated. The aqueous layer is extracted with fresh benzene, and the benzene solutions are combined, dried over anhydrous sodium sulfate and concentrated to dryness by distillation under reduced pressure. Trituration of the resulting solid residue from benzene-hexane affords crystals of 17α-methylestr-4-ene-3β,11β,17β-triol 11-acetate, melting at about 153–155°. This compound exhibits infrared absorption maxima at about 2.76, 3.40 and 5.78 microns and nuclear magnetic resonance peaks at about 60, 70, 122.5, 248, 310 and 325 cycles per second. It is represented by the following structural formula

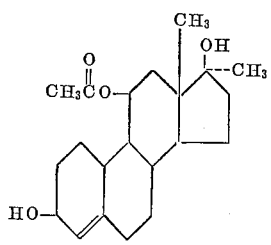

Example 2

When equivalent quantities of 17α-ethyl-11β,17β-dihydroxyestr-4-en-3-one and propionic anhydride are substituted in the initial procedure described in Example 1, there is produced 17α-ethyl-17β-hydroxy-11β-propionoxyestr-4-en-3-one.

When an equivalent quantity of 17α-ethyl-17β-hydroxy-11β-propionoxyestr-4-en-3-one is substituted in the second procedure described in Example 1, there is produced 17α-ethylestr-4-ene-3β,11β,17β-triol 11-propionate.

Example 3

A solution containing 1.8 parts of 17α-methylestr-4-ene-3β,11β,17β-triol 11-acetate, 5 parts of acetic anhydride and 10 parts of pyridine is heated on the steam bath for about 1 hour, then is concentrated to dryness under a stream of nitrogen. The residual material is dissolved in chloroform, and the chloroform solution is washed several times with water, then dried over anhydrous magnesium sulfate and concentrated to dryness under reduced pressure. Purification of that material by thin layer chromatography affords two fractions which are combined and extracted with ethyl acetate. The ethyl acetate extracts are evaporated to dryness under reduced pressure to afford 17α - methyl - estr-4-ene-3β,11β,17β-triol 3,11-diacetate, which exhibits infrared absorption maxima at about 2.74, 3.38 and 5.75 microns and nuclear magnetic resonance peaks at about 60, 71.5, 122.5, 123, 315 and 323 cycles per second. This compound is illustrated by the following structural formula

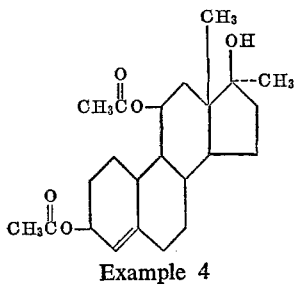

Example 4

When equivalent quantities of 17α-ethylestr-4-ene-3β,11β,17β-triol 11-propionate and propionic anhydride are allowed to react according to the procedure described in Example 3, there is produced 17α-ethylestr-4-ene-3β,11β,17β-triol 3,11-dipropionate.

Example 5

A solution containing 1 part of 11β-hydroxyestr-4-ene-3,17-dione, 2 parts of acetic anhydride and 4 parts of pyridine is heated on the steam bath for about 2 hours, then is cooled and diluted carefully with ice and water while scratching the sides of the container in order to induce crystallization. The resulting crystalline mixture is diluted with water, and the crystals are collected by filtration, then dried to afford the crude product, melting at about 155–160°. Purification of that material from acetone-hexane, following decolorization with activated carbon, affords pure 11β-acetoxyestr-4-ene-3,17-dione, melting at about 160–161°. This compound is characterized further by an optical rotation, in chloroform, of +14° and by nuclear magnetic resonance peaks at about 63, 125, 318–322 and 352 cycles per second.

Example 6

A mixture containing 1 part of 11β-acetoxyestr-4-ene-3,17-dione, 4 parts of lithium tri-(tertiary-butoxy) aluminum hydride and 180 parts of tetrahydrofuran is stirred at room temperature for about 90 minutes, then is stirred vigorously while 3 parts of water, 3 parts by volume of 20% aqueous sodium hydroxide and 10 parts of water are successively added. Stirring is continued for about 10 minutes, after which time the inorganic salts are separated by filtration. The resulting filtrate is diluted with chloroform, and that organic solution is washed several times with saturated aqueous sodium chloride, then dried over anhydrous magnesium sulfate and concentrated to dryness under reduced pressure. Trituration of the resulting residue with benzene affords crystals of estr-4-ene-3β,11β,17β-triol 11-acetate as the benzene solvate, melting at about 95–103°. Further purification by recrystallization from benzene-methylene chloride affords the pure material, melting at about 120–121°. Infrared absorption maxima are observed, in chloroform, at about 2.79, 2.92, 5.80 and 8.00 microns. This compound is represented by the following structural formula

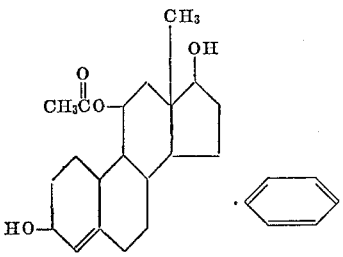

Example 7

When an equivalent quantity of propionic anhydride is substituted in the procedure of Example 5, there is produced 11β-propionoxyestr-4-ene-3,17-dione.

The substitution of an equivalent quantity of 11β-propionoxyestr-4-ene-3,17-dione in the procedure of Example 6 results in estr-4-ene-3β,11β,17β-triol 11-propionate.

Example 8

A solution containing 2 parts of estr-4-ene-3β,11β,17β-triol 11-acetate, 10 parts of acetic anhydride and 20 parts of pyridine is kept at room temperature for about 16 hours, then is concentrated to dryness at approximately 90°. The resulting residue is extracted with chloroform, and the chloroform solution is washed with water, dried over anhydrous magnesium sulfate and concentrated to dryness under reduced pressure. The resulting amorphous solid is estr-4-ene-3β,11β,17β-triol 3,11,17-triacetate, characterized by infrared absorption maxima at about 5.73–5.78, 7.95, 9.58 and 9.73 microns and also by the following structural formula

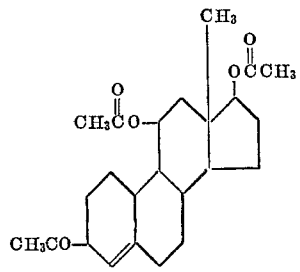

Example 9

When equivalent quantities of estr-4-ene-3β,11β,17β-triol 11-propionate and propionic anhydride are substituted in the procedure of Example 8, there is produced estr-4-ene-3β,11β,17β-triol 3,11,17-tripropionate.

Example 10

When an equivalent quantity of 11β,17β-dihydroxyestr-4-en-3-one is allowed to react with acetic anhydride according to the procedure described in Example 5, there is produced 11β,17β-diacetoxyestr-4-en-3-one, characterized by an ultraviolet absorption maximum at about 238 millimicrons with a molecular extinction coefficient of about 16,100 and by infrared absorption peaks, in chloroform, at about 3.39, 5.76, 5.78, 5.98 and 6.15 microns.

The reduction of an equivalent quantity of 11β,17β-diacetoxyestr-4-en-3-one with lithium tri(tertiary-butoxy) aluminum hydride according to the procedure described in Example 1 results in estr-4-ene-3β,11β,17β-triol 11,17-diacetate.

Example 11

When an equivalent quantity of propionic anhydride is substituted in the initial procedure described in Example 10 there is produced estr-4-ene-3β,11β,17β-triol 11, 17-dipropionate.

The reduction of an equivalent quantity of estr-4-ene-3β,11β,17β-triol 11,17-dipropionate by the procedure described in Example 1 results in estr-4-ene-3β,11β,17β-triol 11,17-dipropionate.

What is claimed is:

1. A compound of the formula

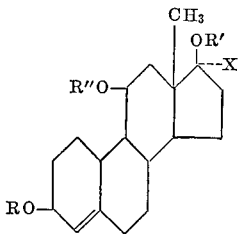

wherein R and R' are selected from the group consisting of hydrogen and a lower alkanoyl radical, R" is a lower alkanoyl radical and X is a member of the class consisting of hydrogen and a lower alkyl radical.

2. As in claim 1, a compound of the formula

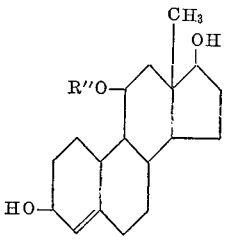

wherein R" is a lower alkanoyl radical.

3. As in claim 1, a compound of the formula

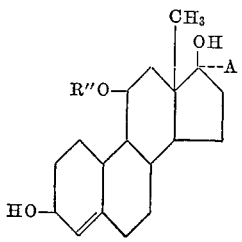

wherein R" is a lower alkanoyl radical and A is a lower alkyl radical.

4. As in claim 1, a compound of the formula

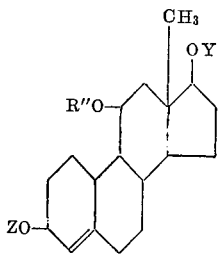

wherein Y, Z and R" are lower alkanoyl radicals.

5. As in claim 1, a compound of the formula

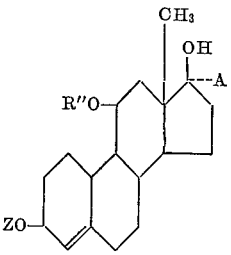

wherein R" and Z are lower alkanoyl radicals and A is a lower alkyl radical.

6. As in claim 1, the compound which is estr-4-ene-3β,11β,17β-triol 11-acetate.

7. As in claim 1, the compound which is estr-4-ene-3β,11β,17β-triol 3,11,17-triacetate.

8. As in claim 1, the compound which is 17α-methyl-estr-4-ene-3β,11β,17β-triol 3,11-diacetate.

9. As in claim 1, the compound which is 17α-methyl-estr-4-ene-3β,11β,17β-triol 11-acetate.

References Cited

UNITED STATES PATENTS

| | | | |
|---|---|---|---|
| 2,861,087 | 11/1958 | Herr | 260—397.5 |
| 2,878,267 | 3/1959 | Szpifogel et al. | 260—397.3 |
| 3,210,392 | 10/1965 | Baran. | |

ELBERT ROBERTS, *Primary Examiner.*

U.S. Cl. X.R.

260—397.45